(No Model.)

W. S. HOOD.
WATER COOLER.

No. 341,244. Patented May 4, 1886.

WITNESSES
C. H. Ourand
Edward Stanton

Walter S. Hood,
INVENTOR

By Louis Bagger & Co.,
Attorneys.

UNITED STATES PATENT OFFICE.

WALTER SCOTT HOOD, OF CONNELLSVILLE, PENNSYLVANIA.

WATER-COOLER.

SPECIFICATION forming part of Letters Patent No. 341,244, dated May 4, 1886.

Application filed January 8, 1886. Serial No. 187,967. (No model.)

*To all whom it may concern:*

Be it known that I, WALTER SCOTT HOOD, a citizen of the United States, and a resident of Connellsville, in the county of Fayette and State of Pennsylvania, have invented certain new and useful Improvements in Water-Coolers; and I do hereby declare that the following is a full, clear, and exact description of the invention, which will enable others skilled in the art to which it appertains to make and use the same, reference being had to the accompanying drawings, which form a part of this specification, and in which—

Figure 1:
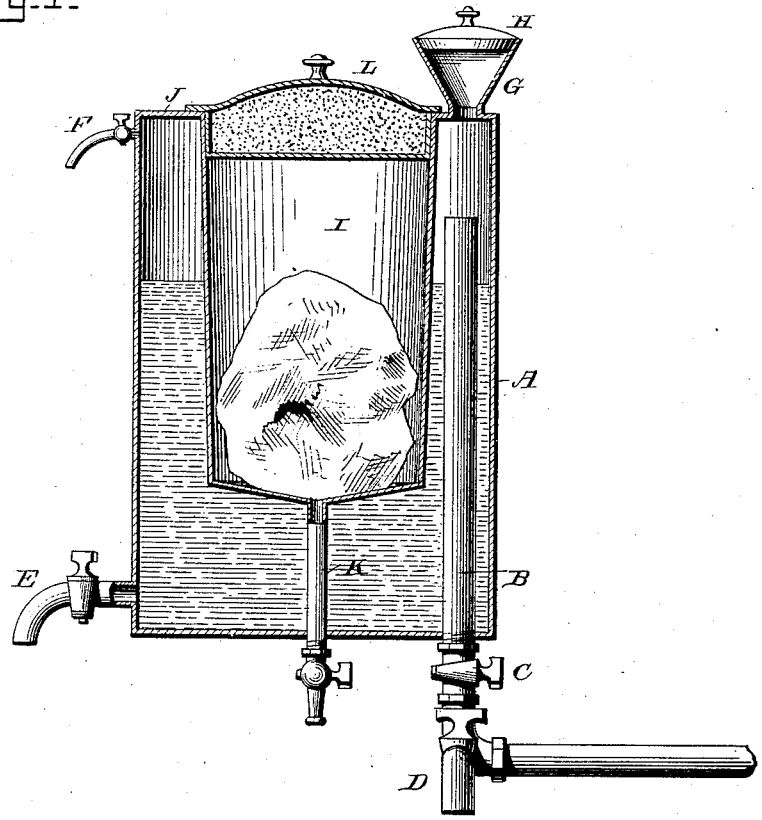
Figure 2:
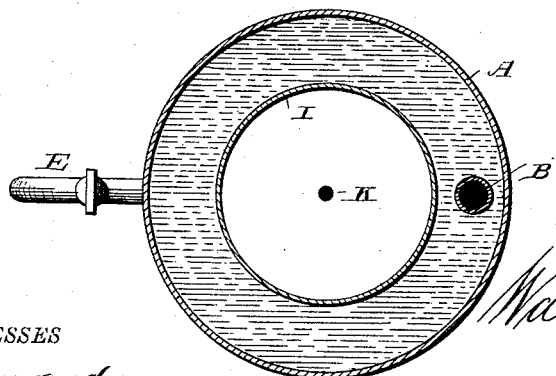

Figure 1 is a vertical sectional view of my improved water-cooler, and Fig. 2 is a horizontal cross-section of the same.

Similar letters of reference indicate corresponding parts in both the figures.

My invention has relation to that class of water-coolers in which the ice is contained in a vessel separated from the vessel containing the water to be cooled; and it consists in the improved construction and combination of parts of the same, as hereinafter more fully described and claimed.

In the accompanying drawings, the letter A indicates the outer wall or casing of the cooler, which casing is preferably cylindrical, although it may be of any other suitable shape, and this casing is provided in its bottom with an inlet-pipe, B, which extends to within a short distance from the top of the casing, and which is provided with a stop-cock, C, for opening or cutting off the supply of water into the casing, and with a faucet, D, below the stop-cock for drawing off water from the pipe without drawing off the contents of the cooler. The casing is furthermore provided with a faucet, E, through which the water may be drawn off from the water-chamber at the bottom of the casing, and near the top of the casing is a small air-faucet, F, or overflow-faucet, through which air may escape from the water-chamber when it is being filled, and through which water may flow when the chamber is full, indicating when to stop letting water into the chamber.

The top of the casing is provided with a funnel, G, having a suitable cover or stopper, H, and water may be filled through this funnel into the chamber when the inlet-pipe, which is connected to the water supply-pipe, is not in use.

A cylindrical or slightly-tapering ice-chamber, I, extends into the casing from the annular top J of the casing to near the bottom of the same, serving for the reception of the ice used in cooling the water, and the bottom of this ice-chamber is provided with an outlet-pipe, K, through which the water from the melted ice may be drawn off, while the open top of the ice-chamber is covered by a lid or cover, L, which is preferably formed with double walls and filled with sawdust, rice-hulls, chaff, or any other non-conductive filling. In this manner the ice may be kept separated from the water, so that impure ice will not pollute the water, and the ice being surrounded by the water will keep for a considerable length of time without melting, the surrounding water-chamber and the filled cover preventing any access of heat to the ice-chamber excepting through the water.

The inlet-pipe is secured to the water-supply pipe, where a water-supply exists, and water may be drawn off from the water-supply pipe, without interfering with the water contained in the cooler, through the faucet upon the supply-pipe below the stop-cock, while cooled water may be drawn off through the faucet at the bottom of the casing.

The water entering the water-chamber through the inlet-pipe will enter at the top of the chamber, so that it will not interfere with the cooled water, which is drawn off from the bottom, and will be sufficiently cooled by the time that it is to be drawn off, the warmer water remaining in the upper part of the chamber.

Where no water-supply exists, the water for the cooler may be filled through the funnel, when the inlet-pipe may be dispensed with.

The faucet at the upper end of the water-chamber will facilitate the filling of the chamber and at the same time serve as an indicator when the chamber is full, letting out the air within the chamber when the latter is filled, and letting out water when the chamber is full.

The water within the water-chamber will be entirely inclosed, without any access for impurities, and any suitable filtering apparatus may be connected to the inlet-pipe for the purpose of purifying the water before entering into the water-chamber.

Having thus described my invention, I claim and desire to secure by Letters Patent of the United States—

In a water-cooler, the combination of a cylindrical casing having a funnel in its annular top, and having a faucet near its top and a faucet near its bottom, an inlet-pipe having a stop-cock, and a faucet below the cock and extending to near the top of the casing, through the bottom of the same, an ice-chamber inserted through the top of the casing, and having an outlet-pipe at its bottom passing through the bottom of the casing, and a filled cover for the open top of the ice-chamber, as and for the purpose shown and set forth.

In testimony that I claim the foregoing as my own I have hereunto affixed my signature in presence of two witnesses.

WALTER SCOTT HOOD.

Witnesses:
JOHN O. SEATON,
HENRY KURTZ.